United States Patent
Korekado et al.

(10) Patent No.: US 7,610,326 B2
(45) Date of Patent: Oct. 27, 2009

(54) ARITHMETIC CIRCUIT FOR CALCULATING A CUMULATIVE VALUE AS A RESULT OF PARALLEL ARITHMETIC PROCESSING

(75) Inventors: Keisuke Korekado, Fukuoka-ken (JP); Osamu Nomura, Fukuoka-ken (JP); Atsushi Iwata, Hiroshima-ken (JP); Takashi Morie, Hiroshima-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 627 days.

(21) Appl. No.: 11/078,287

(22) Filed: Mar. 14, 2005

(65) Prior Publication Data

US 2005/0160130 A1 Jul. 21, 2005

Related U.S. Application Data

(63) Continuation of application No. PCT/JP03/11497, filed on Sep. 9, 2003.

(30) Foreign Application Priority Data

Sep. 18, 2002 (JP) ............... 2002-272180

(51) Int. Cl.
*G06G 7/00* (2006.01)
*G06G 7/02* (2006.01)
(52) U.S. Cl. .................. 708/801; 708/819
(58) Field of Classification Search .......... 708/3, 708/801, 819
See application file for complete search history.

(56) References Cited

U.S. PATENT DOCUMENTS

| | | | | |
|---|---|---|---|---|
| 4,120,035 A | * | 10/1978 | Cases et al. | ............ 708/3 |
| 5,809,214 A | | 9/1998 | Nureki et al. | ......... 395/108 |
| 5,951,632 A | * | 9/1999 | Kochi | ............ 708/801 |
| 6,520,613 B1 | | 2/2003 | Tamura | ............ 347/12 |

(Continued)

FOREIGN PATENT DOCUMENTS

EP 1 089 221 4/2001

(Continued)

OTHER PUBLICATIONS

Morie, T., Funakoshi, J., Nagata, M. and Iwata, A., "An Analog-Digital Merged Neural Circuit Using Pulse Width Modulation Technique", IEICE Transactions on Fundamentals of Electronics, Communications and Computer Sciences, vol. E82-A, No. 2, pp. 356-363, 1999.

(Continued)

*Primary Examiner*—Tan V Mai
(74) *Attorney, Agent, or Firm*—Fitzpatrick, Cella, Harper & Scinto

(57) ABSTRACT

An arithmetic circuit to calculate a cumulative value of results of parallel arithmetic processing, in which the increase of the circuit area for multiple-term arithmetic computation and the degradation of accuracy of holding of computation results in a short time can be prevented. The arithmetic circuit has plural analog arithmetic circuits to perform arithmetic processing based on input analog signals, a capacitor to hold a charge amount proportional to a total sum of results of computations by the plural analog arithmetic circuits, an analog-to-digital (A/D) conversion circuit to convert the charge amount stored in the capacitor to digital data, and a digital arithmetic circuit to calculate a cumulative value based on the converted digital data.

18 Claims, 9 Drawing Sheets

U.S. PATENT DOCUMENTS

| | | | |
|---|---|---|---|
| 2005/0122238 A1 | 6/2005 | Nomura et al. | 341/53 |
| 2005/0138100 A1 | 6/2005 | Nomura et al. | 708/523 |
| 2005/0140736 A1 | 6/2005 | Imanaka et al. | 347/58 |

FOREIGN PATENT DOCUMENTS

| | | |
|---|---|---|
| JP | 643785 | 1/1989 |
| JP | 9-136445 | 5/1997 |
| JP | 9-226102 | 9/1997 |
| JP | 200057241 | 2/2000 |
| JP | 2002-272180 | 9/2002 |
| JP | 2002-272181 | 9/2002 |
| KR | 10-0238857 | 1/2000 |
| KR | 10-0398032 | 3/2004 |
| WO | 95/30962 | 11/1995 |

OTHER PUBLICATIONS

Office Action in JP 2002272180 dated Jul. 9, 2007.

Nakamura et al., "A Pulse Modulation Neural Network Circuit with Arbitrary Nonlinear Activation Functions", Faculty of Eng., Hiroshima Univ.

Morie et al., "Analog neuro-LSI implementing back-propagation algorithm", NTT LSI Laboratories.

\* cited by examiner

ARITHMETIC CIRCUIT FOR CALCULATING A CUMULATIVE VALUE AS A RESULT OF PARALLEL ARITHMETIC PROCESSING

TECHNICAL FIELD

The present invention relates to a analog-digital merged arithmetic circuit which converts a partial sum calculated by an analog circuit as an analog value to a digital value by an A/D conversion circuit at any time and performs addition/subtraction using the digital value, thereby obtains a cumulative value.

BACKGROUND ART

At the present time, computers which have been greatly developed are used in various scenes. However, in these Neumann computers, the performance of processing easily made by humans (real-time face recognition or the like) is very low due to their processing system itself.

Regarding this inconvenience, a neural network is studied as an arithmetic processing model in analogy to the brain information processing system.

Generally, in a neural network, a unit corresponding to a neuron inputs products obtained by weighting output values from other plural units (neurons) with synapse weight values, and outputs a value obtained by performing nonlinear conversion on a total sum of the input values.

That is, in a general neural network, summation of products and nonlinear conversion in and among the respective units realize desired processing.

As a neural network architecture using this neuron model, an associated memory where units having a nonlinear input/output characteristic are mutually connected, a pattern recognition model where the units having a nonlinear input/output characteristic are connected in a layer, and the like, have been proposed.

As the neural network is a massively parallel and distributed type information processing model, it is implemented very inefficiently in a sequential-processing type Neumann computer. Accordingly, upon practical use of the neural network, it is necessarily implemented as. a specialized hardware integrated circuit.

Further, upon implementation as an integrated circuit, if an analog arithmetic circuit is employed to realize the above-described summation of products and nonlinear conversion, the number of circuit components is greatly reduced in comparison with a digital arithmetic circuit.

That is, in a case where the summation of products and nonlinear conversion are realized by an analog arithmetic circuit, by functionally utilizing physical characteristics of devices and materials, a desired function can be realized with a greatly smaller number of components in comparison with a digital arithmetic circuit. Various circuits have been proposed as circuits appropriate to the above-described neuron model and neural network architecture.

For example, T. Morie, J. Funakoshi, M. Nagata and A. Iwata propose, in "An Analog-Digital Merged Neural Circuit Using Pulse Width Modulation Technique" (IEICE Trans. Fundamentals, Vol. E82-A, No. 2, pp. 356-363, 1999, http://search.ieice.org/1999/files/e000a02.htm/e82-a,2,356), a system having capacitors corresponding to positive and negative synapse weights to store results of summation for respective signs as electric charges, then to obtain the result of addition between the positive and negative charges by coupling the capacitors.

However, in this system, in a case where the results of parallel arithmetic processing by a large number of analog arithmetic circuits are held with high accuracy, the capacity of the capacitors must be increased. Accordingly, from a viewpoint of area on the chip, further improvement in the performance is desired for reduction of the capacity of the capacitors.

Further, in the system, 2 capacitors must be prepared for respective positive and negative synapse weights. Accordingly, from a viewpoint of area on the chip, further improvement in the performance is desired for reduction of the total capacity of the capacitors.

Further, in a case where a cumulative value is to be calculated using the results of arithmetic computations, it is necessary to hold the results of arithmetic computations for a long time with high accuracy. In this case, there is a problem that the electric charges stored in the capacitors are lost in a short time due to leakage from a pn junction. Accordingly, further improvement in the performance is desired.

DISCLOSURE OF THE INVENTION

The present invention has been made in consideration of the above problems, and has its object to provide an arithmetic circuit in which the increment of the circuit area for multiple-term arithmetic computation and the degradation of accuracy of holding of computation results in a short time can be prevented.

According to the present invention, the foregoing object is attained by providing an arithmetic circuit for calculating a cumulative value as a result of parallel arithmetic processing, comprising: plural analog arithmetic circuits that perform arithmetic processing based on input analog signals; a capacitor that holds a charge amount proportional to a total sum of results of computations by said plural analog arithmetic circuits; an A/D conversion circuit that converts the charge amount stored in said capacitor to digital data; and a digital arithmetic circuit that calculates a cumulative value based on the converted digital data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

FIRST EMBODIMENT

Hereinbelow, a first embodiment will be described in detail with reference to the drawings.

Figure 1:
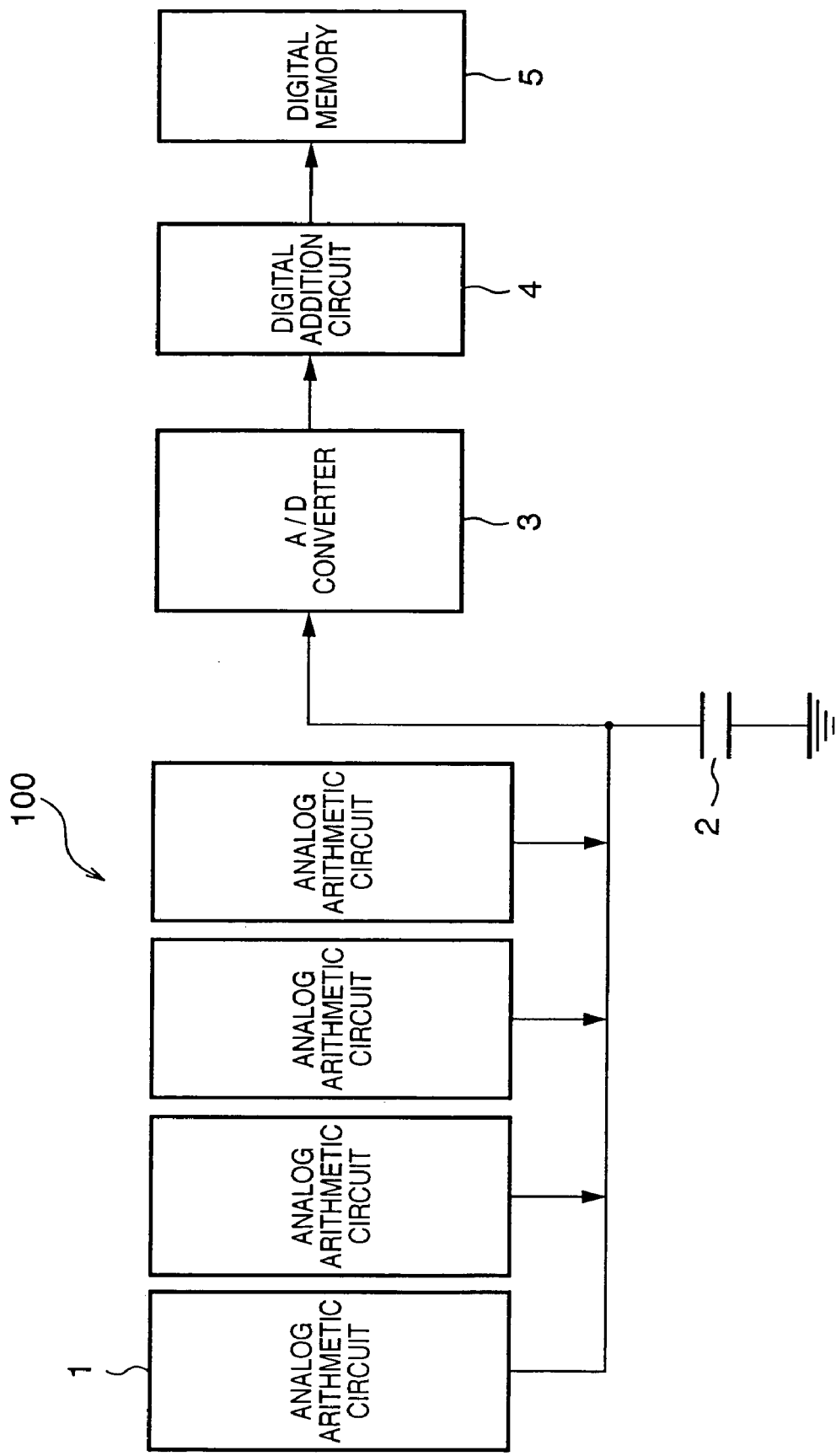
FIG. 1 illustrates the construction of an analog-digital merged arithmetic circuit according to a first embodiment.

FIG. 1 illustrates the entire construction of an analog-digital merged arithmetic circuit 100 of the present embodiment.

As shown in FIG. 1, the analog-digital merged arithmetic circuit has plural analog arithmetic circuits 1, a capacitor 2 connected to the plural analog arithmetic circuits 1, an A/D converter 3 connected to the capacitor 2, a digital addition circuit 4 connected to the A/D converter 3, and a digital memory 5 connected to the digital addition circuit 4.

The analog-digital merged arithmetic circuit 100 realizes a function of calculating a cumulative value of plural multiplication results.

Figure 2:
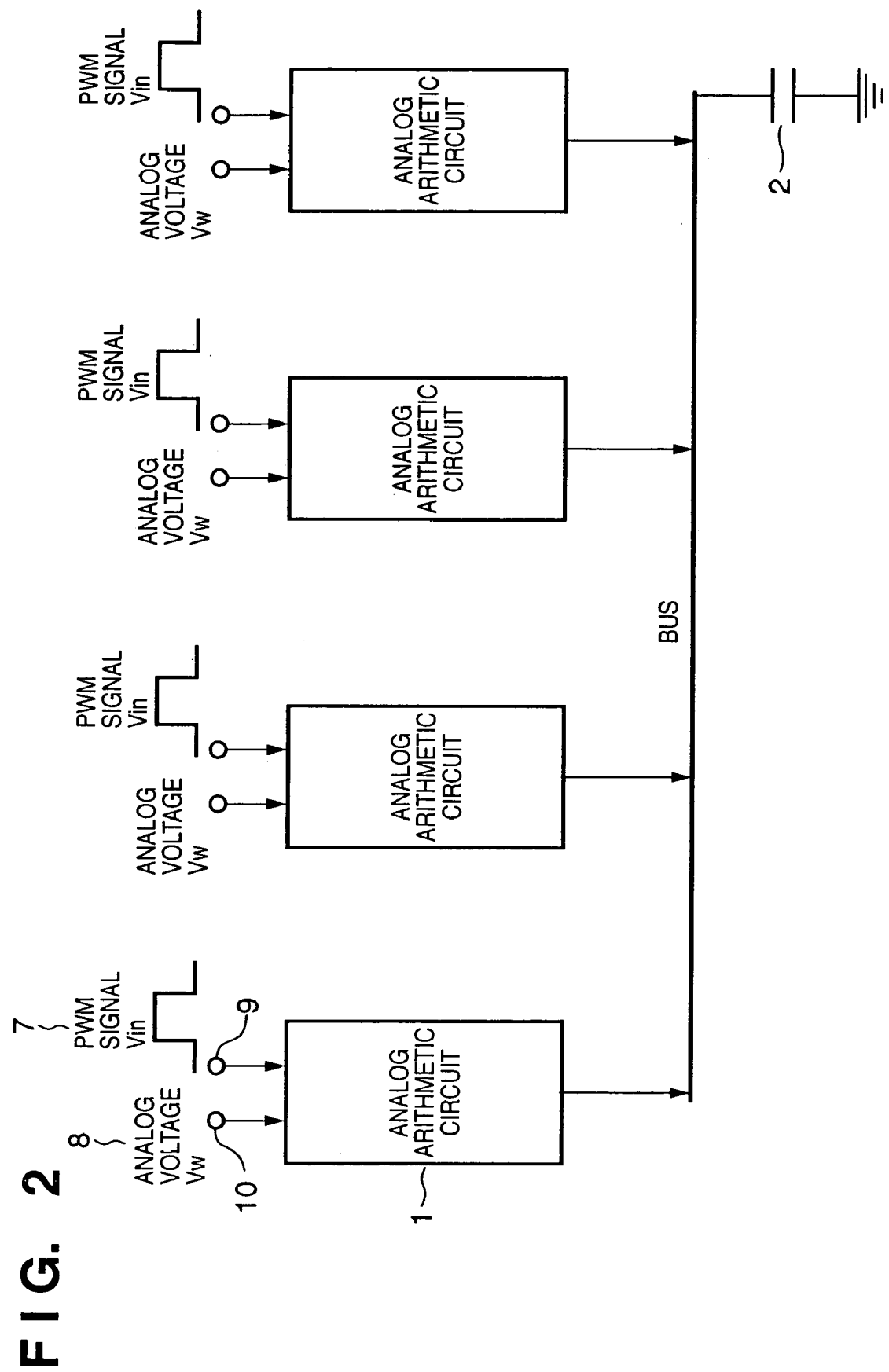
FIG. 2 illustrates analog arithmetic circuits and a capacitor constructing the analog-digital merged arithmetic circuit according to the first embodiment.

Further, FIG. 2 illustrates in detail the arrangement of the analog arithmetic circuits 1 and the capacitor 2 in FIG. 1. As shown in FIG. 2, the plural analog arithmetic circuits 1 are connected in parallel to a bus connected to the capacitor 2.

Figure 3:
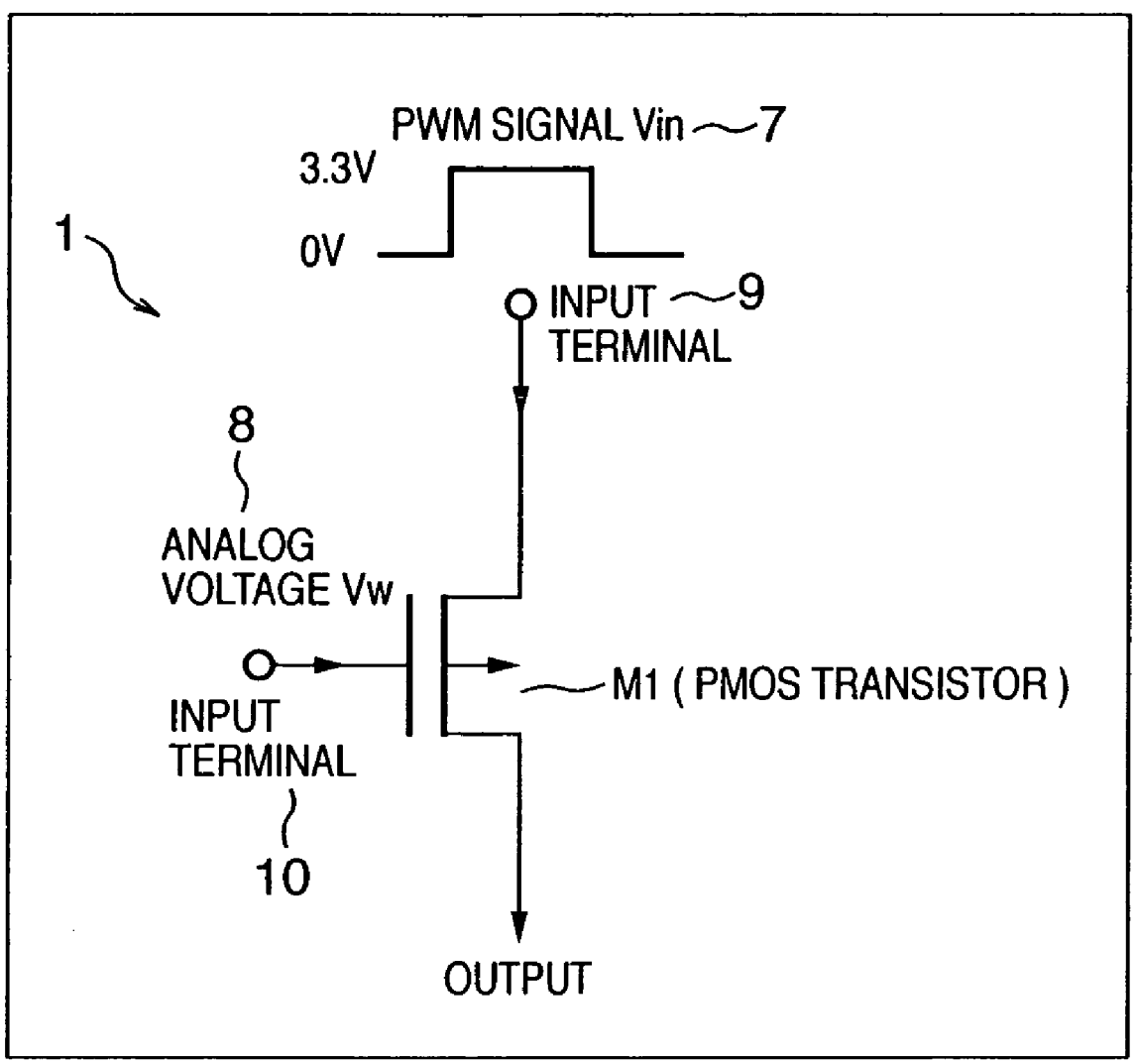
FIG. 3 illustrates the analog arithmetic circuit of the analog-digital merged arithmetic circuit according to the first embodiment.

Further, FIG. 3 illustrates a detailed arrangement of the analog arithmetic circuit 1 of the present embodiment. As shown in FIG. 3, the analog arithmetic circuit 1 of the present embodiment has one PMOS transistor M1 which functions as a constant current source.

Here, the process of arithmetic processing in the analog arithmetic circuit 1 will be described with reference to FIG. 3, then the storage of the result of computation by the analog arithmetic circuit 1 into the capacitor 2 as a partial sum will be described with reference to FIG. 2, and further, calculation of a desired cumulative value from the partial sums will be described with reference to FIG. 1.

In the present embodiment, the analog arithmetic circuit 1 shown in FIG. 3 realizes a multiplication between a multiplicand A and a multiplier B (A×B). Note that the factors A and B satisfy the following conditional expressions.

A≧0 and
B≧0

To realize the above-described multiplication by the analog arithmetic circuit 1, the multiplicand A and the multiplier B are inputted as a PWM signal Vin7 obtained from a predetermined conversion and an analog voltage Vw8.

Note that any other analog arithmetic circuits than the above analog arithmetic circuit 1 may be employed as long as it performs any computation (e.g. nonlinear conversion).

First, in FIG. 3, the PWM signal Vin7, obtained by performing predetermined conversion on the multiplicand A, is inputted into an input terminal 9, and the analog voltage Vw8, obtained by performing predetermined conversion on the multiplier B, is inputted into an input terminal 10.

Next, the characteristics of a PWM signal will be briefly described. PWM (Pulse Width Modulation) is a modulation method of carrying information with pulse wave width. The method has a digital characteristic of high noise resistance (High level and Low level binary information is held in a voltage direction), and an analog characteristic of 1-pulse representation of continuous information (continuous information is held in a time direction).

The Vw8 voltage corresponding to the multiplier B inputted into the input terminal 10 is applied to a gate terminal of the transistor M1, and the PWM signal Vin7 from the input terminal 9 is inputted into a source terminal of the transistor M1. Note that the PWM signal is set such that the Low level is 0 V and the High level is a power source voltage Vdd (3.3 V in the present embodiment).

The analog voltage Vw8 is set within an appropriate voltage range such that the transistor M1 operates in a saturation region when the PWM signal is at the High level, i.e., the voltage Vdd is applied to the source terminal of the transistor M1, thus the M1 operates as a constant current source while the PWM signal is at the High level.

Further, the amount of current which flows through the transistor M1 at this time is determined by a gate-source voltage, (Vdd-Vw). At this time, the pulse width of the PWM signal Vin7 is converted in proportion to the multiplicand A. Further, the analog voltage Vw8 is converted such that the amount of current determined by (Vdd-Vw) is proportional to the multiplier B.

Accordingly, since the current, determined by the above-described (Vdd-Vw) which flows through the transistor M1 only when the PWM signal is at the High level, the amount of charge which flows through the transistor M1 is proportional to A×B.

Next, the storage of the result of computation by the analog arithmetic circuit 1 as a partial sum into the capacitor 2 will be described with reference to FIG. 2. In FIG. 2, the charge which flows through the transistor M1 is stored into the capacitor 2 connected via the bus to the analog arithmetic circuit 1.

As the bus is connected to the plural analog arithmetic circuits 1 to independently perform a computation, the results of computations performed in parallel by the respective analog arithmetic circuits, i.e., the above-described amounts of charge are stored through the bus into the capacitor 2 and added there.

Accordingly, the total amount of charges stored in the capacitor 2 upon completion of one parallel arithmetic processing indicates a total sum of the results of computations by the plural analog arithmetic circuits 1 connected via the common bus to the capacitor 2. Note that as described later, the total sum corresponds to a partial sum of a cumulative value to be finally calculated.

Next, the process of calculation of a desired cumulative value from the partial sum will be described with reference to FIG. 1.

In the present embodiment, the desired cumulative value is represented with the following expression (1).

$$\sum_{i=1}^{12} Ai \times Bi \qquad (1)$$

To obtain the final cumulative value, a construction where the 4 analog arithmetic circuits 1 are connected via the bus to the capacitor 2 as shown in FIG. 2 is used. Note that in this case, even if the total number of arithmetic computations (12 in the present embodiment) is not a multiple of the number of the analog arithmetic circuits (4), the number of computations can be controlled by inputting the analog voltage Vw8 corresponding to the multiplier B=0.

First, as described in FIG. 2, a computation represented with the following expression (2) is performed in parallel by the 4 analog arithmetic circuits 1, and the results of computations are stored into the capacitor 2 as charge amounts or voltage values.

$$\sum_{i=1}^{4} Ai \times Bi \quad (2)$$

The results of computations can be regarded as a partial sum of the desired computation (expression (1)).

Next, the results of computations held in the capacitor 2 as the analog charge amounts or voltage values are converted to digital values by the A/D converter 3. Further, the digital values are added to a digital value held in the digital memory 5 by the digital addition circuit 4, and the result of computation is held in the digital memory 5.

Note that as the above-described computation is calculation of the first partial sum of the desired arithmetic computation (expression (1)), no partial sum is previously held in the digital memory 5 and all "0" are stored there. Accordingly, the digital value held in the digital memory 5 are equal to the results of computation in the expression (2).

Next, the second partial sum is calculated by the analog arithmetic circuits 1 as in the case of the above first partial sum. That is, as described in FIG. 2, computation represented with the following expression (3) is performed in parallel by the 4 analog arithmetic circuits 1, and the results of computations are stored into the capacitor 2 as charge amounts of voltage values.

$$\sum_{i=5}^{8} Ai \times Bi \quad (3)$$

The results of computations here can be regarded as a partial sum of the desired arithmetic computation (expression (1)).

Next, the results of computations held in the capacitor 2 as the analog charge amounts or voltage values are converted to digital values by the A/D converter 3.

Further, the digital values are added to the digital value held in the digital memory 5 by the digital addition circuit 4, and the result of computation is held in the digital memory 5.

Note that as the digital value previously held in the digital memory 5 corresponds to the results of computations of the expression (2), the result of addition of the results of computations of the expression (3) to the above digital value is stored into the digital memory 5 as represented with the following expression (4).

$$\sum_{i=1}^{4} Ai \times Bi + \sum_{i=5}^{8} Ai \times Bi = \sum_{i=1}^{8} Ai \times Bi \quad (4)$$

Next, calculation of the third partial sum is performed by the analog arithmetic circuits 1 as in the case of the above partial sum. That is, as described in FIG. 2, arithmetic computation represented with the following expression (5) is performed in parallel by the 4 analog arithmetic circuits 1, and the results of computations are stored into the capacitor 2 as charge amounts or voltage values.

$$\sum_{i=9}^{12} Ai \times Bi \quad (5)$$

The results of computation can be regarded as a partial sum of the desired arithmetic computation (expression (1)).

Next, the results of computations held in the capacitor 2 as the analog charge amounts or voltage values are converted to digital values by the A/D converter 3.

Further, the digital values are added to the digital value held in the digital memory 5 by the digital addition circuit 4, and the result of computation is held in the digital memory 5.

Note that as the digital value previously held in the digital memory 5 corresponds to the results of computations of the expression (4), the result of addition of the results of computation of the expression (5) to the above digital value is stored into the digital memory 5 as the desired cumulative value as represented with the following expression (6).

$$\sum_{i=1}^{8} Ai \times Bi + \sum_{i=9}^{12} Ai \times Bi = \sum_{i=1}^{12} Ai \times Bi \quad (6)$$

As described above, plural multiplications are performed by the analog arithmetic circuits 1, and the respective results as analog values are added in the capacitor 2, thus a partial sum of a desired cumulative value is calculated.

Further, the above calculated partial sum is converted to digital data by the A/D converter 3, then the digital value is added to a value held in the digital memory 5 by the digital addition circuit 4, thereby a desired arithmetic computation is realized.

In this manner, upon practical use of a massively parallel and distributed type information processing model, as arithmetic computations such as summation and nonlinear conversion are realized by using the analog arithmetic circuits, the number of circuit components is greatly reduced (the circuit area can be reduced) in comparison with a digital arithmetic circuit. On the other hand, as charge amounts (or voltage values) stored in the capacitor are converted to digital data then subjected to addition processing, and the result of addition is stored into the digital memory at any time so that a desired cumulative value can be obtained, the problem that the charges stored in the capacitor are lost in a short time can be solved, and the cumulative value as a result of arithmetic computation can be held for a long time.

SECOND EMBODIMENT

Figure 4:
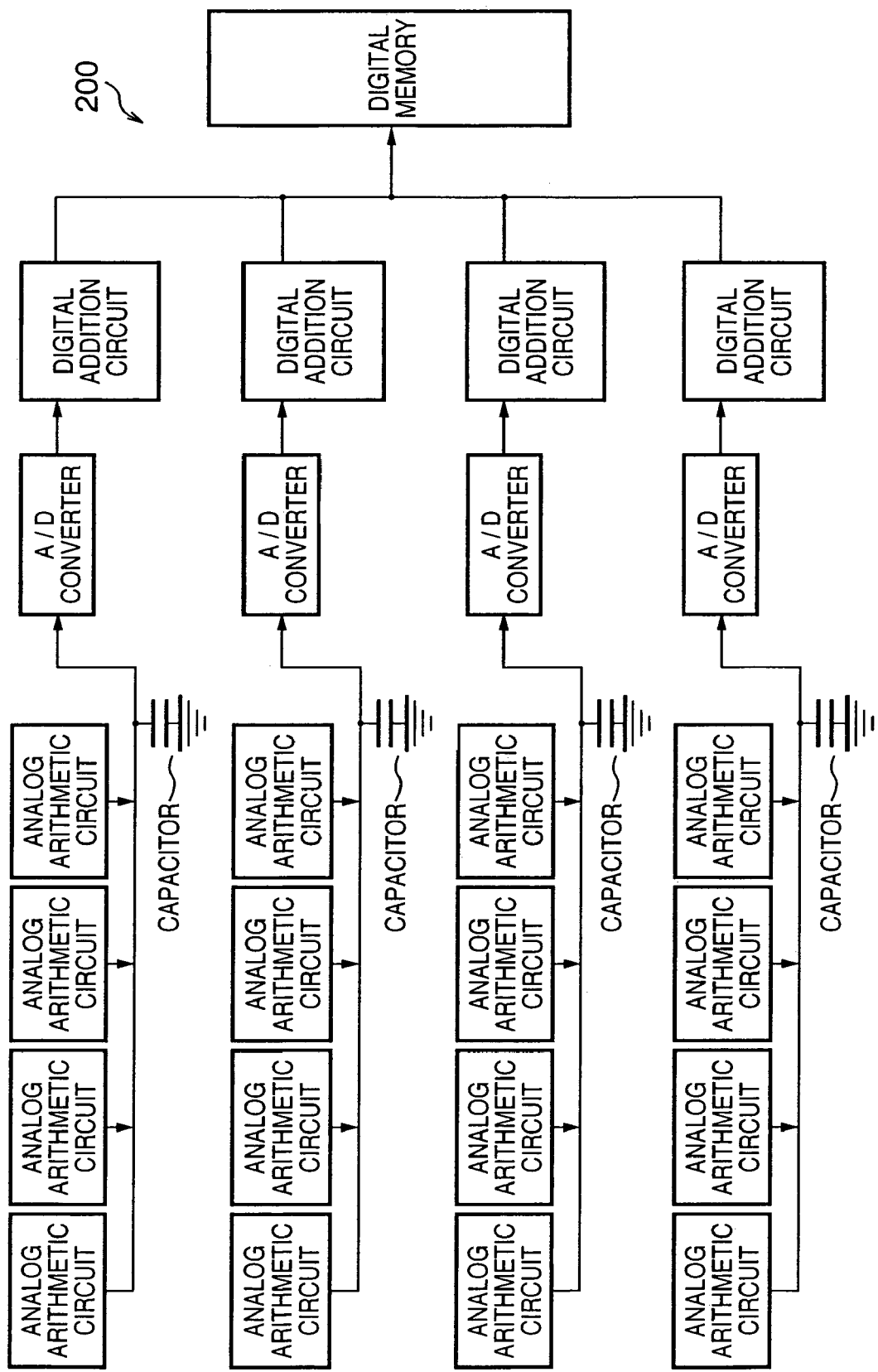
FIG. 4 illustrates the construction of the analog-digital merged arithmetic circuit according to a second embodiment.

FIG. 4 shows an example of the construction of an analog-digital merged arithmetic circuit 200 according to a second embodiment.

As it is apparent from FIG. 4, the present embodiment is different from the first embodiment in that plural analog-digital merged arithmetic circuits 100 described in the first embodiment are provided.

Note that in FIG. 4, the digital memory in each analog-digital merged arithmetic circuit is illustrated as one digital memory having a common construction. The total number of bits of the digital memory is the same.

Further, in FIG. 4, the 4 analog-digital merged arithmetic circuits described in the first embodiment are cascaded, however, any number of analog-digital merged arithmetic circuits may be provided as long as plural circuits are used. Further, any other appropriate arrangement of the circuits than the cascade arrangement may be employed.

In this arrangement, the arithmetic calculation described in the first embodiment can be performed in parallel. In a case where plural cumulative values are calculated, the time of computation can be further reduced in comparison with serial repetition of the above-described arithmetic computation.

That is, the 4 analog-digital merged arithmetic circuits in FIG. 4 respectively perform the arithmetic computation as described in the first embodiment and store the final cumulative value into the digital memory.

For example, in a case where 4 types of cumulative values are calculated in the first embodiment, the arithmetic computation described in the first embodiment must be performed 4 times (further in this case, a mechanism to read a cumulative value upon completion of 1 arithmetic computation is required). However, in the case of the present embodiment where analog-digital arithmetic circuits are cascaded, the 4 types of cumulative values can be calculated in 1 parallel arithmetic computation by the 4 analog-digital merged arithmetic circuits. That is, an advantage similar to that of the first embodiment can be obtained, and higher-speed processing in comparison with the arithmetic circuit of the first embodiment can be realized.

THIRD EMBODIMENT

Figure 5:
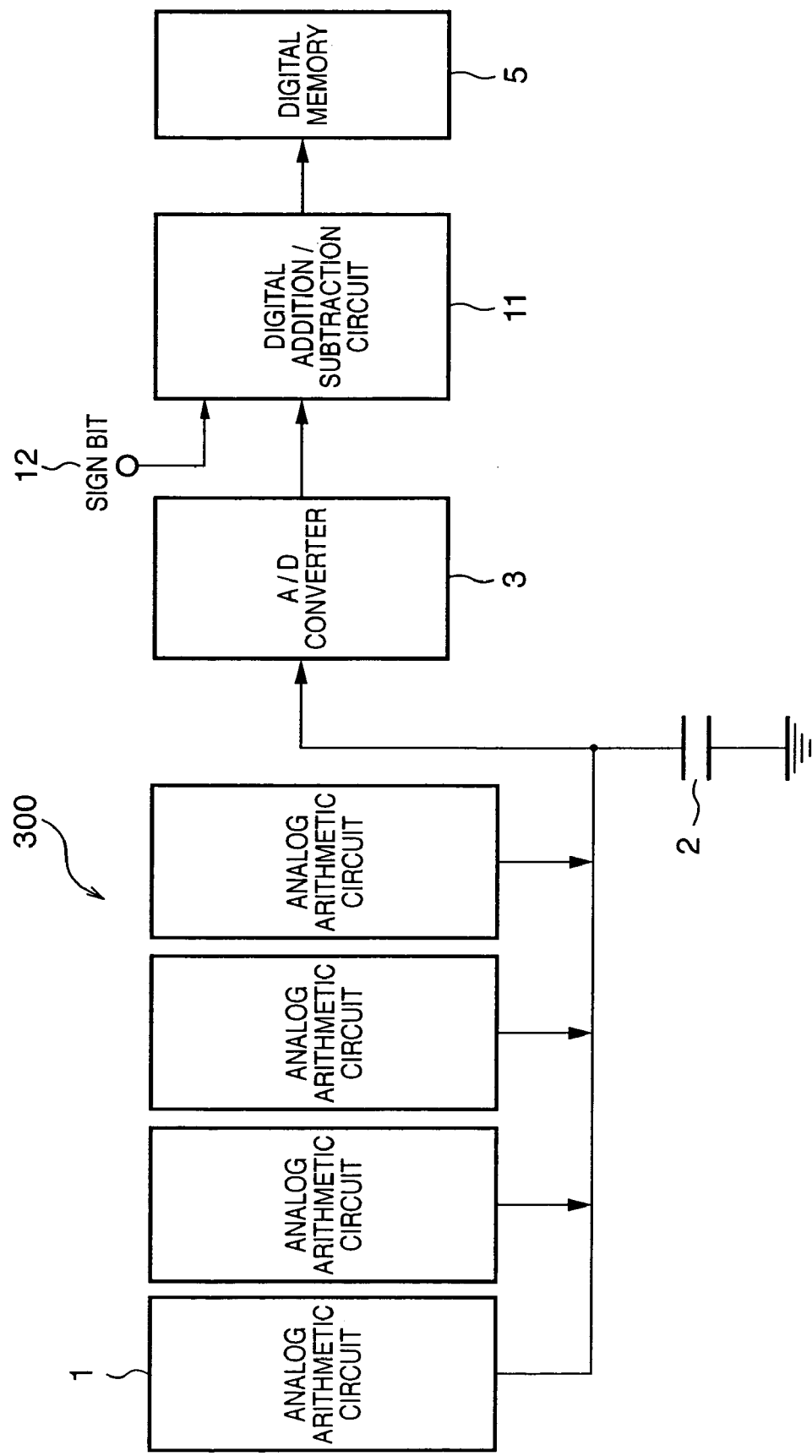
FIG. 5 illustrates the construction of an analog-digital merged arithmetic circuit according to a third embodiment.

FIG. 5 shows an example of the construction of an analog-digital merged arithmetic circuit 300 according to a third embodiment.

The present embodiment, differs from the first and second embodiments in that, in the analog-digital merged arithmetic circuit described in the first and second embodiments, the digital addition circuit is replaced with a digital addition/subtraction circuit 11. Further, in the analog arithmetic circuit 1, a multiplication is performed for respective positive and negative signs of the multiplier B. Further, a sign bit 12 indicating the sign of the multiplier B is inputted into the digital addition/subtraction circuit 11. Further, a partial sum as a result of computation on the negative multiplier B is subtracted from digital data held in the digital memory by the digital addition/subtraction circuit.

That is, the multiplication in the analog arithmetic circuit 1 of the present embodiment is multiplication for the positive sign of the multiplier B and multiplication for the negative sign of the multiplier B.

Hereinbelow, the procedure of the above arithmetic computation will be described in detail. In a case where an arithmetic computation represented with the following expression (7) is performed by the analog-digital merged arithmetic circuit 300 in FIG. 5, the 4 analog arithmetic circuits 1 perform computations for positive and negative signs of the multiplier B as represented with expressions (8), (9), (10) and (11).

$$\sum_{i=1}^{16} Ai \times Bi \quad (7)$$

$Ai \geq 0$ $B_1, B_2, B_5, B_7, B_9, B_{10}, B_{14}, B_{16}, \geq 0,$ $B_3, B_4, B_6, B_8, B_{11}, B_{12}, B_{13}, B_{15}, < 0$ $$A_1 \cdot B_1 + A_2 \cdot B_2 + A_5 \cdot B_5 + A_7 \cdot B_7 \quad (8)$$

$$A_9 \cdot B_9 + A_{10} \cdot B_{10} + A_{14} \cdot B_{14} + A_{16} \cdot B_{16} \quad (9)$$

$$A_3 \cdot B_3 + A_4 \cdot B_4 + A_6 \cdot B_6 + A_8 \cdot B_8 \quad (10)$$

$$A_{11} \cdot B_{11} + A_{12} \cdot B_{12} + A_{13} \cdot B_{13} + A_{15} \cdot B_{15} \quad (11)$$

Note that at this time, as in the case of the first embodiment, even if the total number of computations (16 in the above case) is not a multiple of the number of the analog arithmetic circuits (4), the number of computations can be controlled by inputting the analog voltage Vw8 corresponding to the multiplier B=0.

Next, as in the case of the first and second embodiments, partial sums represented with the expressions (8) to (11) are calculated by the analog arithmetic circuits 1. Note that at this time, the respective partial sums are calculated as absolute values without consideration of the positive and negative signs of the multiplier B.

Next, the partial sums represented with the expressions (8) to (11) are converted to digital data by the A/D converter 3, and the digital data are inputted into the digital addition/subtraction circuit 11. At this time, a sign bit 12 indicating the sign of the multiplier B is also inputted into the digital addition/subtraction circuit 11.

Next, in the digital addition/subtraction circuit 11, when the sign bit of the inputted digital data of the partial sum is 1 (the multiplier B is positive), as in the case of the first and second embodiments, the input digital data of the partial sum is added to digital data held in the digital memory.

On the other hand, if the sign bit of the input digital data of the partial sum is 0 (the multiplier B is negative), the input digital data of the partial sum is subtracted from the digital data held in the digital memory.

As described above, in correspondence with positive and negative signs of the multiplier B, partial sums are respectively calculated by the analog arithmetic circuit 1, and further in correspondence with the positive and negative signs, addition/subtraction is performed between the partial sums and the digital data held in the digital memory 5, thereby a cumulative value of the results of multiplications including positive and negative signs can be calculated without capacitors respectively for positive and negative signs, as represented with the following expression (12).

$$\begin{aligned} & (A_1 \cdot B_1 + A_2 \cdot B_2 + A_5 \cdot B_5 + A_7 \cdot B_7) + \\ & (A_9 \cdot B_9 + A_{10} \cdot B_{10} + A_{14} \cdot B_{14} + A_{16} \cdot B_{16}) - \\ & (A_3 \cdot B_3 + A_4 \cdot B_4 + A_6 \cdot B_6 + A_8 \cdot B_8) - \\ & (A_{11} \cdot B_{11} + A_{12} \cdot B_{12} + A_{13} \cdot B_{13} + A_{15} \cdot B_{15}) \end{aligned} = \sum_{i=1}^{16} Ai \times Bi \quad (12)$$

Further, in the above computation, in a case where the arithmetic processes corresponding to the positive and negative signs of the multiplier B are alternately performed as represented in the following expression (13), as the positive and negative partial sums cancel out each other, the range of accuracy of linear addition (range of cumulative value) in the digital memory 5 can be narrowed, and the bit length of the digital memory 5 can be reduced.

$$\begin{aligned} & (A_1 \cdot B_1 + A_2 \cdot B_2 + A_5 \cdot B_5 + A_7 \cdot B_7) - \\ & (A_3 \cdot B_3 + A_4 \cdot B_4 + A_6 \cdot B_6 + A_8 \cdot B_8) + \\ & (A_9 \cdot B_9 + A_{10} \cdot B_{10} + A_{14} \cdot B_{14} + A_{16} \cdot B_{16}) - \\ & (A_{11} \cdot B_{11} + A_{12} \cdot B_{12} + A_{13} \cdot B_{13} + A_{15} \cdot B_{15}) \end{aligned} = \sum_{i=1}^{16} Ai \times Bi \quad (13)$$

For example, in a case where the partial sums represented with the expressions (8) to (11) are sequentially (85, 53, 60 and 71), if addition/subtraction is performed with continuously the same sign, the values held in the digital memory 5 in the middle of the computation are represented with the following expressions (14) to (17).

$$\text{value stored upon first computation} = 85 \quad (14)$$

$$\text{value stored upon second computation} = 85 + 53 \quad (15)$$
$$= 138$$

$$\text{value stored upon third computation} = 138 - 60 \quad (16)$$
$$= 78$$

$$\text{value stored upon fourth computation} = 78 - 71 \quad (17)$$
$$= 7$$

Accordingly, a maximum value in the middle of the addition/subtraction of the partial sums is 138, and the necessary bit length of the digital memory 5 is 8 bits.

On the other hand, in a case where computations corresponding to the positive and negative signs are alternately performed, the values stored in the digital memory 5 in the middle of the computations are represented with the following expressions (18) to (21).

$$\text{value stored upon first computation} = 85 \quad (18)$$

$$\text{value stored upon first computation} = 85 \quad (18)$$

$$\text{value stored upon second computation} = 85 - 60 = 25 \quad (19)$$

$$\text{value stored upon third computation} = 25 + 53 = 78 \quad (20)$$

$$\text{value stored upon fourth computation} = 78 - 71 = 7 \quad (21)$$

Accordingly, a maximum value in the middle of the addition/subtraction of the partial sums is 85, and the bit length of the digital memory 5 is 7 bits less than that of the previous example.

FOURTH EMBODIMENT

Figure 6:
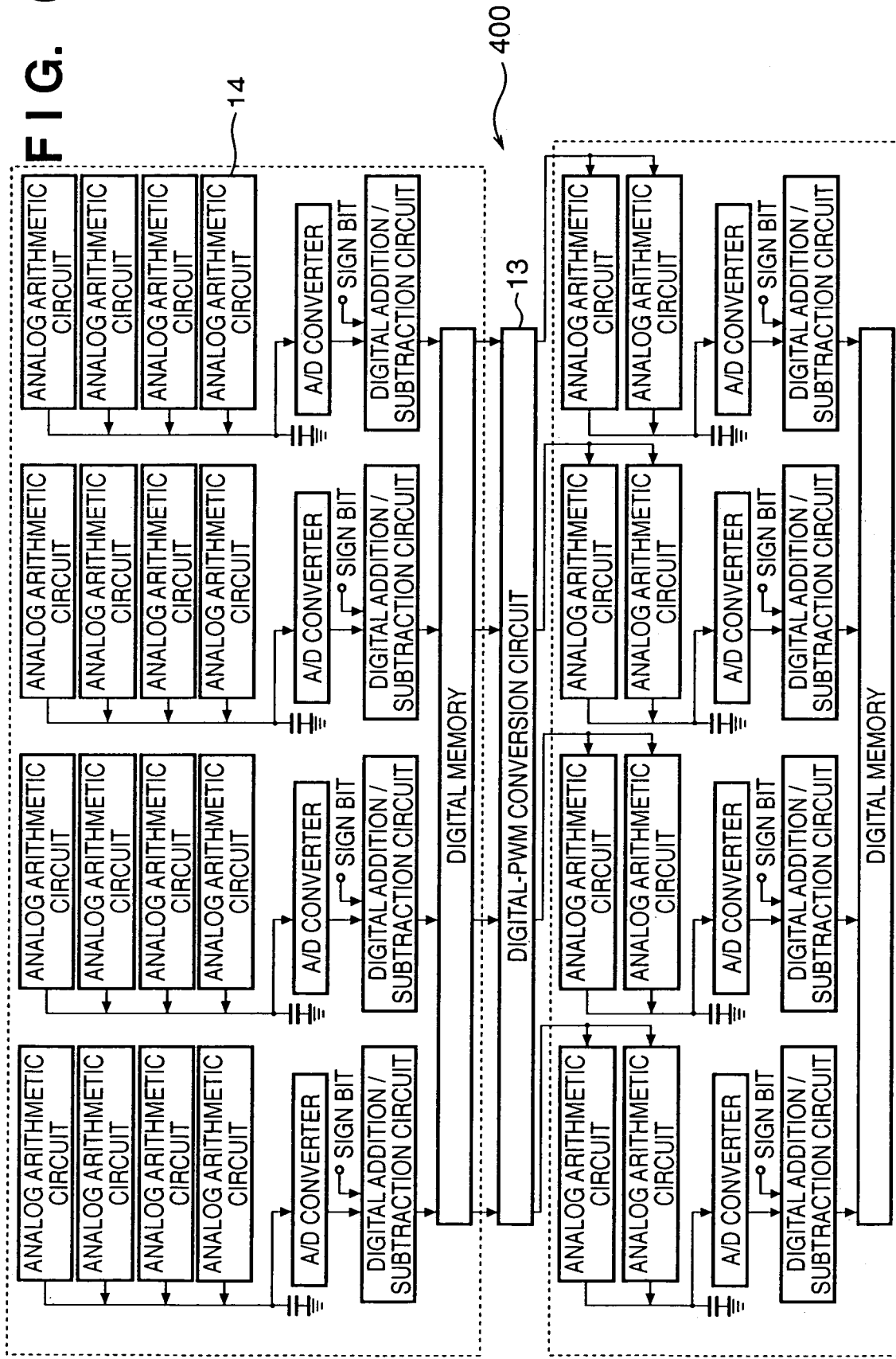
FIG. 6 illustrates the construction of a neural network circuit.

FIG. 6 shows an example of the construction of a neural network circuit 400 according to a fourth embodiment. As shown in FIG. 6, the neural network circuit 400 of the present embodiment includes the analog-digital merged arithmetic circuit described in the first to third embodiments and a digital-PWM conversion circuit 13.

Note that different from the first to third embodiments, an analog arithmetic circuit 14 which can simultaneously perform weighting and nonlinear conversion is employed as the analog arithmetic circuit in the analog-digital merged arithmetic circuit.

Figure 7:
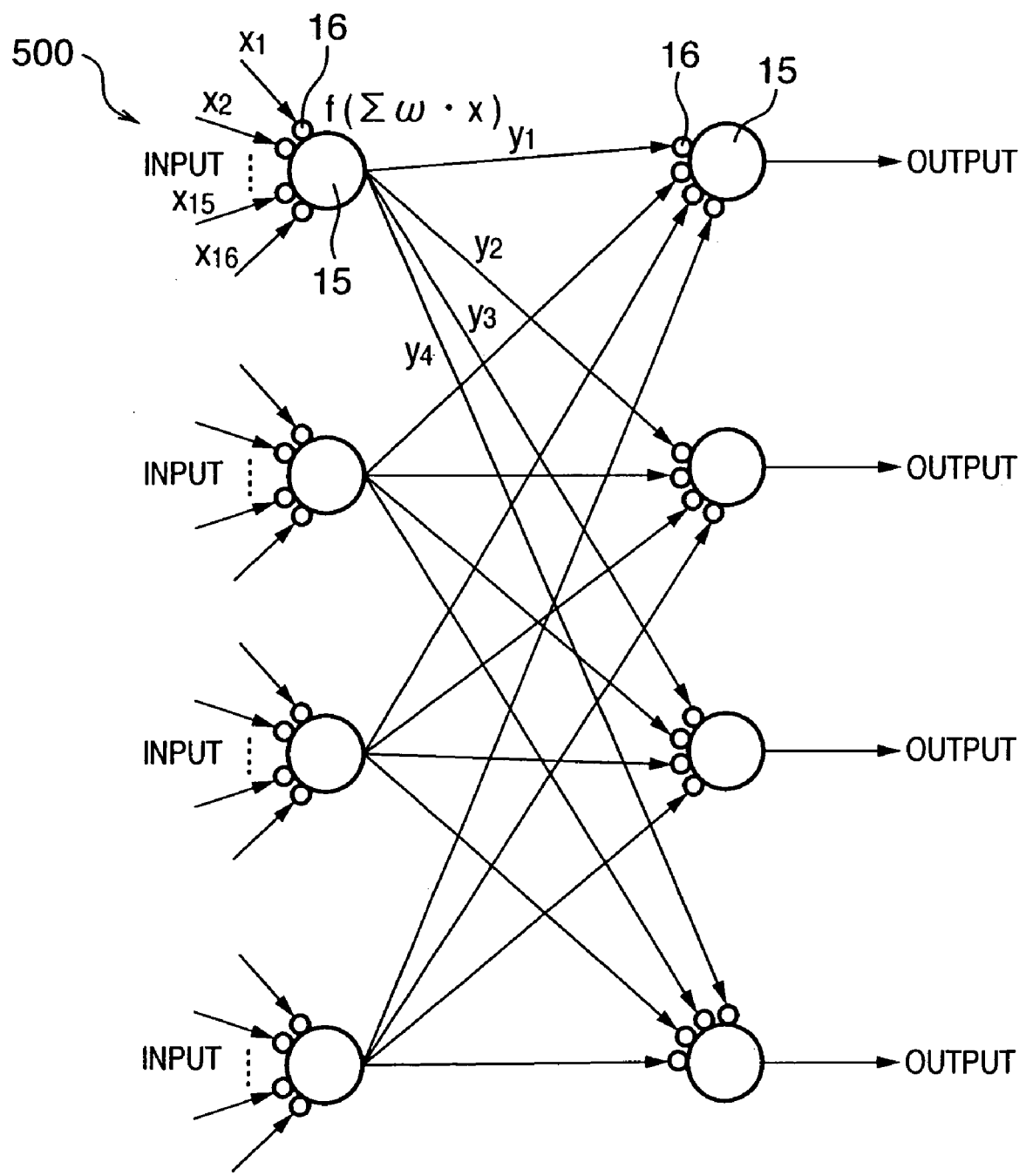
FIG. 7 illustrates the structure of a neural network model.
Figure 8:
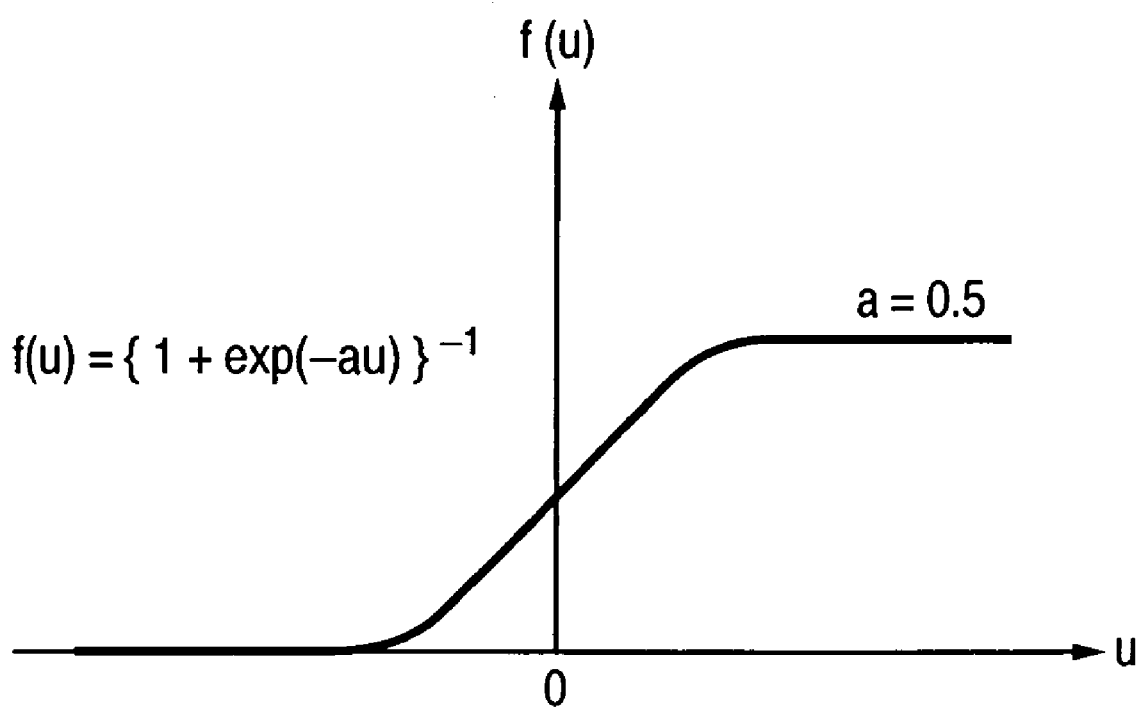
FIG. 8 shows a characteristic of a neuron.

Further, FIG. 7 shows the construction of a neural network model 500 realized in the present embodiment, and FIG. 8 shows a characteristic of each neuron.

Hereinbelow, the neural network model in the present embodiment will be first described with reference to FIGS. 7 and 8, and the neural network circuit 400 according to the present embodiment will be described with reference to FIG. 6.

As shown in FIG. 7, in the neural network of the present embodiment, plural neurons 15 constitute a layer structure, and the neurons 15 in different layers are interconnected via synapses 16.

Note that other neural network structures than that of the present embodiment such as a structure of arrayed neurons are known, and as connection among neurons, other forms such as mutual connection between 2 neurons are known.

The neural network of the present embodiment is not limited to the structure and connection form, but other structures and connection forms may be employed.

Next, arithmetic processing in each neuron 15 will be described with reference to FIG. 8. Each neuron 15 weights outputs from plural previous-stage neurons 15 with synapse weights then receives the outputs as inputs. Inside the neuron, a total sum of the input values is calculated, then a predetermined conversion is performed on the sum as an output value. The arithmetic processing in each neuron is as represented with the following expression (22).

$$y = f\left(\sum \omega \cdot x\right) \quad (22)$$

y: output value, f: conversion function, ω: synapse weight, x: previous-stage neuron output value Note that as the conversion function, various models are proposed, however, in the present embodiment, a general Sigmoid function represented with the following expression (23) is employed. FIG. 8 shows the characteristic of the Sigmoid function.

$$f(u) = \{1 + \exp(-au)\}^{-1} \quad (23)$$

(a is a parameter to determine the slope of the Sigmoid function)

Note that the neural network of the present embodiment is not limited to the conversion method in the neuron but any other conversion function than the Sigmoid function of the present embodiment may be used.

Next, the neural network circuit of the present embodiment will be described with reference to FIG. 6. As it is understood from FIG. 6, the neural network circuit of the present embodiment includes a hierarchical structure of analog-digital merged arithmetic circuits described in the second and third embodiments.

Note that the analog arithmetic circuit 14 in the analog-digital merged arithmetic circuit of the present embodiment is different from that of the second and third embodiments in that it can simultaneously perform weighting and nonlinear conversion.

The analog arithmetic circuit 14 which can simultaneously perform weighting and nonlinear conversion realizes the weighting computation in FIG. 7 using the nonlinear-converted output values from the previous-stage neurons and the synapse weights in the neuron model.

Note that since the operation mechanism of the analog arithmetic circuit 14 which can simultaneously perform weighting and nonlinear conversion is not the subject matter of the present invention, the explanation thereof will be omitted (about the details, see the Japanese Patent Application No. 2002-272181 filed at the same time of the filing of the present priority Japanese Patent Application 2002-272180 by the applicant).

Further, in the analog-digital merged arithmetic circuit of the present embodiment, as hierarchical arithmetic processing is performed, the result of computation by an analog-digital merged arithmetic circuit in some layer is an input to an analog-digital merged arithmetic circuit in the next layer.

At this time, the result of computation held in the digital memory is read as a PWM signal by the digital-PWM conversion circuit 13. The digital-PWM conversion circuit 13 has a function of counting discrete values held in the digital memory using a counter and generating a PWM signal having a time width equal to the time used in the counting.

In the present embodiment, the digital-PWM conversion circuit 13 having the above function is designed by logic synthesis, however, any other circuit may be used as long as it has the function of reading digital data and generating a PWM signal. Further, as the digital-PWM conversion circuit is not the subject matter of the present invention, the detailed explanation thereof will be omitted.

The arithmetic processing in the analog-digital merged arithmetic circuit of the present embodiment is the same as that in the second and third embodiments except the above-described arithmetic process by the analog arithmetic circuit 14 and the above-described reading of the result of computation by the digital-PWM conversion circuit 13.

Note that in the arithmetic processing in the analog-digital merged arithmetic circuit, the partial sum held in the capacitor realizes the total sum of the input values in each neuron regarding a part of connection with the previous-stage neurons, and the cumulative value finally held in the digital memory realizes the cumulative value of all the input values in each neuron from the connected previous-stage neurons. Note that as described above, the nonlinear conversion as shown in FIG. 8 is realized in the analog arithmetic circuit 14.

As described above, the neural network model as shown in FIG. 7 can be realized by reading the cumulative values as analog values in the respective neurons held in the digital memory by the digital-PWM conversion circuit, as outputs to the next-layer neurons.

FIFTH EMBODIMENT

Figure 9:
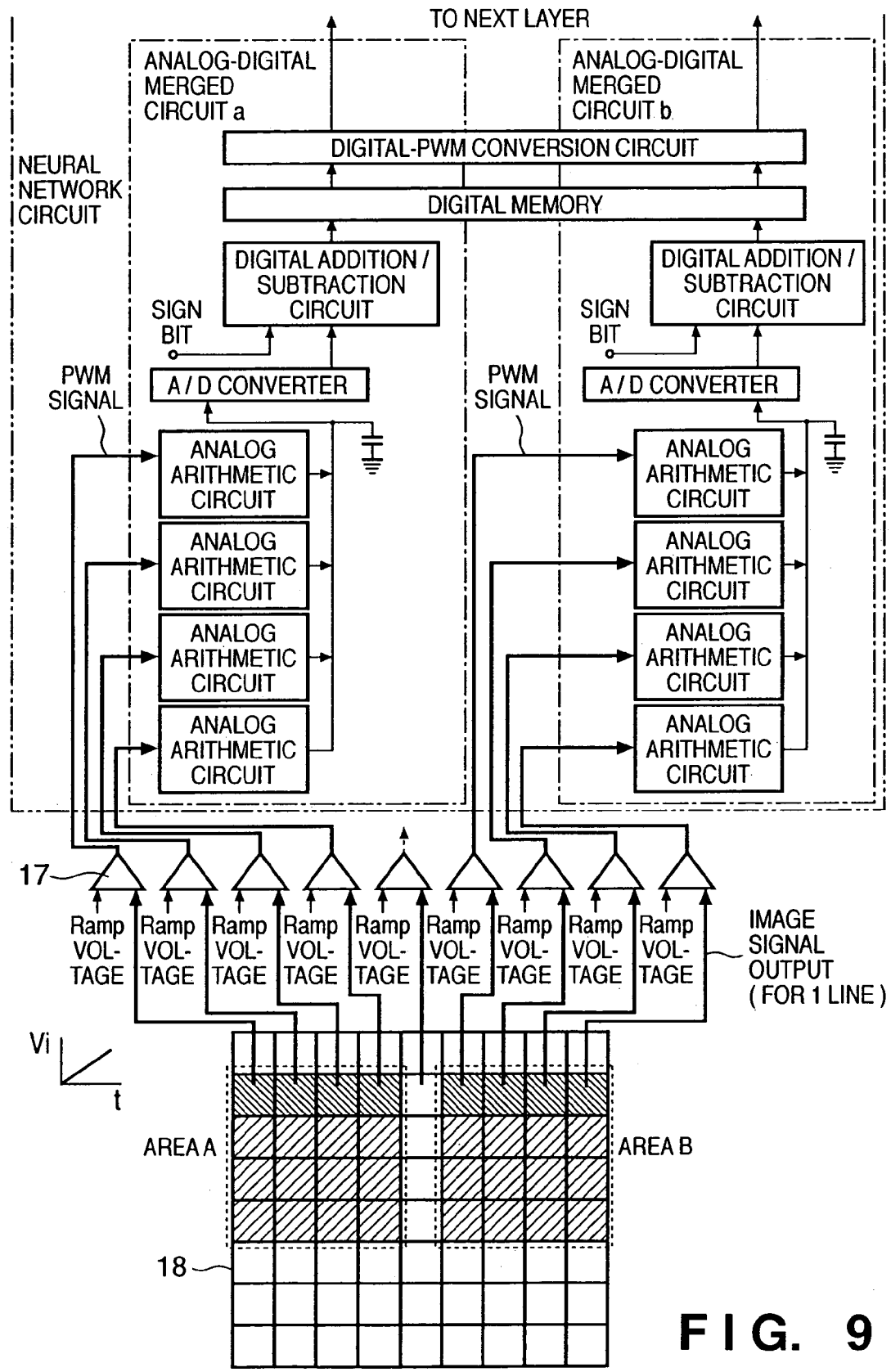
FIG. 9 illustrates the construction of an image signal processing circuit having the neural network circuit.

FIG. 9 shows an example of the construction of an image signal processing circuit according to a fifth embodiment. As shown in FIG. 9, the image signal processing circuit of the present embodiment includes the neural network circuit described in the fourth embodiment. Note that in FIG. 9, only the initial stage of the hierarchical structure described in the fourth embodiment is shown, and the subsequent layers are omitted.

Further, the number of the analog-digital merged arithmetic circuits in the neural network circuit is different from that of the neural network circuit in FIG. 6 described in the fourth embodiment, however, the computation operation itself in the each analog-digital merged arithmetic circuit is the same as that of the fourth embodiment.

A signal inputted into the analog arithmetic circuit in the neural network circuit as a PWM signal is an image signal which is a two-dimensional signal. That is, the purpose of the image signal processing circuit of the present embodiment is performing a predetermined computation on an input image signal by the neural network circuit, thereby performing desired image processing (for example, pattern detection and pattern recognition).

Note that as the contents of actually-realized image processing, desired processing (for example, pattern detection and pattern recognition) can be realized by appropriately controlling circuit parameters and the like in the neural network circuit, however, as the details of the control is not the subject matter of the present invention, the explanation thereof will be omitted.

In the present embodiment, the image signal is inputted as a PWM signal where signal intensities corresponding to respective pixels, outputted from an image sensing device (for example, a CCD or a CMOS image sensor), are where converted to pulse time widths.

As shown in FIG. 9, upon conversion of the output signal from the image sensing device to the PWM signal, a comparator 17 compares an input ramp voltage waveform with a voltage value read from the image sensing device. The PWM signal is generated such that output rose to the High level upon start of the ramp voltage waveform falls to the Low level when the ramp voltage value becomes equal to the capacitor voltage value.

Note that as the PWM signal generation process is not the subject matter of the present invention, a more detailed explanation will be omitted.

Further, in the present embodiment, the image sensing device is premised on use of a CCD or a CMOS image sensor, however, any other image sensing device may be employed as long as it inputs an image signal as a two-dimensional signal.

Next, the method of inputting the image signal into the neural network circuit will be described.

As described in the fourth embodiment, in the neural network circuit, in the respective analog-digital merged arithmetic circuits a and b, nonlinear conversion and weighting are performed on plural predetermined input signals, and a cumulative value therefrom is calculated as an internal state value of a corresponding neuron.

At this time, in the image processing circuit of the present embodiment, the plural input signals to be processed by the respective analog-digital merged arithmetic circuits a and b, surrounded with an alternate long and short dash line, correspond to parts of two-dimensionally arrayed areas of an image sensing device 18.

That is, as shown in FIG. 9, the areas subjected to the nonlinear conversion and weighting by the respective analog-digital merged arithmetic circuits a and b and further to calculation of cumulative value are indicated as areas A and B surrounded with a broken line. The image signal output from the image sensing device is made for 1 line.

As described in the first to fourth embodiments, the arithmetic computations by the analog arithmetic circuits in the neural network circuit can be performed in parallel on the 1-line image signal output.

Accordingly, as described in the first to fourth embodiments, the result of computation by the neural network circuit on the 1-line output signal from the image sensing device corresponds to a partial sum of the internal state value in each neuron.

Then the above arithmetic processing is repeated for the number of lines of the areas A and B (4 times in the present embodiment), thereby a cumulative value corresponding to the internal state value in each. neuron can be calculated.

In this manner, desired arithmetic processing (for example, pattern detection and pattern recognition) can be achieved by repeating the arithmetic processing by the neural network circuit by the number of lines of the processed area.

Further, in the above description, the image signal output from the image sensing device is made for 1 line, however, even in a case where the signal output from the image sensing device is made for 1 row, similar processing to the above processing can be performed by performing the arithmetic computation by the neural network circuit in parallel for 1 row.

As apparent from the above description, desired arithmetic processing can be realized by applying arithmetic computation by the neural network circuit of the present embodiment to the image signal outputted by 1 line or 1 row, calculating a neuron internal state value as a partial sum by 1 line or 1 row, and calculating a final internal state value as a cumulative value of the partial sums.

The present invention is not limited to the above embodiments and various changes and modifications can be made within the spirit and scope of the present invention. Therefore, to appraise the public of the scope of the present invention, the following claims are made.

The invention claimed is:

1. An arithmetic circuit for calculating a cumulative value as a result of parallel arithmetic processing, comprising:
   plural analog arithmetic circuits that perform arithmetic processing based on input analog signals;
   a capacitor that holds a charge amount proportional to a total sum of results of computations by said plural analog arithmetic circuits;
   an A/D conversion circuit that converts the charge amount stored in said capacitor to digital data;
   a memory that holds digital data; and
   a digital arithmetic circuit that calculates a cumulative value by adding the converted digital data to the digital data held in said memory and writing the result of the addition in said memory.

2. The arithmetic circuit according to claim 1, wherein parallel-connected said plural analog arithmetic circuits are serially connected to said capacitor.

3. The arithmetic circuit according to claim 1, wherein a charge amount corresponding to a partial sum of the calculated cumulative value is stored in said capacitor based on the input analog signals.

4. The arithmetic circuit according to claim 1, wherein said digital arithmetic circuit performs processing upon completion of the arithmetic processing by said plural analog arithmetic circuits.

5. The arithmetic circuit according to claim 1, wherein said analog arithmetic circuit multiplies the input analog signal by a predetermined weight value.

6. The arithmetic circuit according to claim 1, wherein said analog arithmetic circuit performs predetermined nonlinear conversion on the input analog signal.

7. The arithmetic circuit according to claim 6, wherein said analog arithmetic circuit multiples an output value from the nonlinear conversion by a predetermined weight value.

8. The arithmetic circuit according to claim 1, wherein the cumulative value calculated based on the input analog signals is equivalent to an internal state value of a neuron constituting a neural network that inputs the input analog signals as input values.

9. The arithmetic circuit according to claim 1, wherein the charge amount stored in said capacitor is equivalent to a partial sum of an internal state value of a neuron constituting a neural network that inputs the input analog signals as input values.

10. The arithmetic circuit according to claim 1, wherein the input analog signal is an image signal, and wherein said analog arithmetic circuit performs the arithmetic processing on the image signal by 1 line.

11. The arithmetic circuit according to claim 1, wherein said analog arithmetic circuit has a transistor that inputs the inputted analog signal into a source terminal, and applies a predetermined voltage to a gate terminal.

12. An arithmetic circuit for calculating a cumulative value as a result of parallel arithmetic processing, comprising:
    plural analog arithmetic circuits that perform arithmetic processing based on input analog signals and output absolute values of results of computations;
    a capacitor that holds a charge amount proportional to a total sum of the absolute values of the results of computations by said plural analog arithmetic circuits;
    an A/D conversion circuit that converts the charge amount stored in said capacitor to digital data;
    a memory that holds digital data; and
    a digital arithmetic circuit that adds the converted digital data to the digital data held in said memory and writes the result of the addition in said memory if the results of computations by said analog arithmetic circuits are positive, and that subtracts the converted digital data from the digital data held in said memory and writes the result of the subtraction in said memory if the results of computations by said analog arithmetic circuits are negative, thereby calculating a cumulative value of the digital data.

13. The arithmetic circuit according to claim 12, wherein parallel-connected said plural analog arithmetic circuits are serially connected to said capacitor.

14. The arithmetic circuit according to claim 12, wherein a charge amount corresponding to a partial sum of the calculated cumulative value is stored in said capacitor based on the input analog signals.

15. The arithmetic circuit according to claim 12, wherein said digital arithmetic circuit performs processing upon completion of the arithmetic processing by said plural analog arithmetic circuits.

16. The arithmetic circuit according to claim 12, wherein the cumulative value calculated based on the input analog signals is equivalent to an internal state value of a neuron constituting a neural network that inputs the input analog signals as input values.

17. The arithmetic circuit according to claim 12, wherein the charge amount stored in said capacitor is equivalent to a partial sum of an internal state value of a neuron constituting a neural network that inputs the input analog signals as input values.

18. The arithmetic circuit according to claim 12, wherein said digital arithmetic circuit alternately performs addition processing and subtraction processing.

* * * * *